United States Patent
Muise

[15] 3,668,043
[45] June 6, 1972

[54] METHOD OF BONDING POLYPROPYLENE TO RUBBER AND THE METHOD OF MAKING INSULATED ELECTRICAL CONDUCTORS THEREFROM

[72] Inventor: Gordon J. Muise, Westboro, Mass.
[73] Assignee: United Steel Corporation
[22] Filed: Nov. 17, 1970
[21] Appl. No.: 90,473

Related U.S. Application Data

[62] Division of Ser. No. 801,188, Sept. 20, 1969, Pat. No. 3,592,728.

[52] U.S. Cl. ............................ 156/321, 156/322, 156/333, 161/242, 161/243, 161/253, 117/72
[51] Int. Cl. ........................................ C09j 5/00, B32b 25/08
[58] Field of Search .................. 156/321, 322, 333; 161/242, 161/243; 117/72, 77

[56] References Cited

UNITED STATES PATENTS

| 3,157,564 | 11/1964 | Tucker et al. | 161/243 |
| 3,258,389 | 6/1966 | Coleman et al. | 161/218 |
| 3,515,616 | 6/1970 | Miyamoto et al. | 156/330 |

Primary Examiner—John T. Goolkasian
Assistant Examiner—Lorraine T. Kendell
Attorney—Donald S. Ferito

[57] ABSTRACT

The method of the invention comprises the steps of providing an electrically conductive metal core, covering the core with a polyolefin insulating layer, heating the insulating layer to a temperature of 400° to 500° F., then applying a suitable adhesive composition to the insulating layer while it is in the temperature range of 400° to 500° F., then applying a second application of the adhesive composition to the polyolefin-adhesive covered conductor, and then applying an elastomer sheath to the polyolefin-adhesive covered conductor after the second application of adhesive composition has been applied thereto.

2 Claims, No Drawings

METHOD OF BONDING POLYPROPYLENE TO RUBBER AND THE METHOD OF MAKING INSULATED ELECTRICAL CONDUCTORS THEREFROM

This application is a division of my copending application, Ser. No. 801,188, filed Sept. 20, 1969 and now U.S. Pat. No. 3,592,728.

The present invention relates generally to electrical conductors and more particularly to a method of making an improved insulated electrical conductor having a polyolefin insulating layer such as polypropylene and an elastomer layer such as neoprene bonded to the insulating layer by a suitable adhesive.

In the manufacture of electrical cable, it is usual practice to coat the metal conductors comprising the same with a layer of insulating material. It is desirable that the insulating layer be flexible as well as possess good electrical insulating properties. One of the substances that is excellent for such use is the polyolefin polypropylene. In addition to being a flexible electrical insulator, polypropylene is a thermoplastic which presents a surface that is relatively inert chemically. This latter property, together with its excellent electrical insulating properties and flexibility makes polypropylene an outstanding insulation for electrical conductors. However, polypropylene does not have the necessary rugged durability to withstand rough usage such as, for example, that encountered in the use of mining machine cables which must be dragged over rough ground, rocks and other abrasive surfaces in normal use. For this reason, it is necessary to provide a protective sheath, sleeve or jacket of a substantially abrasive resistance elastomer such as neoprene over the polypropylene insulation. Prior to my invention, it was extremely difficult to effect an adhesive bond between the polypropylene and the neoprene or other elastomer jacket since the surface of the polypropylene insulation was chemically inert and would not effectively accept a conventional adhesive bonding agent in a conventional manner.

It is, accordingly, the primary object of my invention to provide an improved method for making an insulated electrical conductor whereby an elastomer jacket can be easily and effectively bonded to a polyolefin-insulated electrical conductor.

It is another object of my invention to provide an improved method of bonding an elastomer to a polyolefin material.

It is a more specialized object of my invention to provide an improved method for making an insulated electrical conductor having a polyolefin insulation and an elastomer jacket on the polyolefin insulation and the method of bonding an elastomer such as neoprene, butyl rubber, natural rubber, or chlorosulfonated polyethylene to a polyolefin such as polypropylene, polyethylene or cross-linked polyethylene including the steps of heating the polyolefin to a near-molten condition (400°to 500° F.), then applying to the polyolefin while it is at near-molten condition an adhesive composition consisting of chlorinated rubber, brominated poly 2,3-dichlorobutadiene-1,3 and at least 1 percent, by weight, based on the weight of the solids in said composition of a poly-C-nitroso aromatic compound, then applying a second application of said adhesive composition to said adhesive-coated polyolefin, and then applying the elastomer to the polyolefin after said second application of adhesive composition has been applied thereto, said elastomer being applied under pressure to bond the elastomer to the polyolefin.

These and other objects will become more apparent after referring to the following description and explanation.

DESCRIPTION OF THE INVENTION

To produce electrical cable in accordance with the present invention, the polypropylene insulation is applied to the electrical metal conductor of the cable by extrusion and the insulated conductor emerges from the extruder with the polypropylene coating thereon in a near-molten condition at a temperature range of approximately 400° to 500° F. and preferably 475° to 500° F.

As the polypropylene-coated conductor emerges from the extruder, an adhesive composition, sold under the trade mark Chemlok 220, and manufactured by Hughson Chemical Company, Division of Lord Corporation of Erie, Pennsylvania, is applied onto the near-molten polypropylene insulation as a spray. Chemlok 220 is available on the commercial market and is described and claimed in U.S. Pat. No. 3,258,389, dated June 28, 1966. The Chemlok 220 adhesive composition consists of chlorinated rubber, brominated poly 2,3-dichlorobutadiene-1,3 and at least 1 percent, by weight, based on the weight of the solids in said composition, of a poly-C-nitroso aromatic compound. When it is desired to apply the Chemlok 220 as a spray, the adhesive is diluted with xylene and is applied as a fine mist under pneumatic pressure. It will be noted, however, the manner of application of the adhesive to the polypropylene is not restricted to spraying. It may be applied by other methods such as by passing the polypropylene insulated conductor through a full strength solution of the adhesive composition.

The polypropylene-and-adhesive coated conductor is then passed through a water filled trough and taken up on a reel. Then the polypropylene-and-adhesive coated conductor is taken off of the reel and another application of the adhesive Chemlok 220 is applied thereto.

A protective sheath or jacket of neoprene is then applied to the polypropylene-and-adhesive coated conductor by extrusion whereby the neoprene is bonded to the polypropylene.

It was found that the method of the invention could be used with equally beneficial results in applying other elastomers such as butyl rubber, natural rubber and chlorosulfonated polyethylene to any of the polyolefins of the group consisting of polypropylene, polyethylene, and cross-linked polyethylene.

I claim:

1. A method of bonding one of the group of elastomers consisting of neoprene, butyl rubber, natural rubber, and chlorosulfonated polyethylene to one of the group of polyolefins consisting of polypropylene, polyethylene, and cross-linked polyethylene comprising the steps of first heating the polyolefin to a temperature ranging from 400° to 500° F., then applying to said polyolefin, while said polyolefin is at said temperature, an adhesive composition consisting of chlorinated rubber, brominated poly 2,3-dichlorobutadiene-1,3 and at least 1 percent, by weight, based on the weight of the solids in said composition, of a poly-C-nitroso aromatic compound, then applying a second application of said adhesive composition to said polyolefin, and then applying said elastomer to the adhesive coated polyolefin under pressure to bond said elastomer to said polyolefin.

2. A method of bonding neoprene to polypropylene comprising the steps of first heating said polypropylene to a temperature ranging from 475° to 500° F. then applying to said polypropylene, while said polypropylene is at said temperature, an adhesive composition consisting of chlorinated rubber, brominated poly 2,3-dichlorobutadiene-1,3 and at least 1 percent, by weight, based on the weight of the solids in said composition, of a poly-C-nitroso aromatic compound, then applying a second application of said adhesive composition to said polypropylene, and then applying said neoprene to the adhesive coated polypropylene under pressure to bond said neoprene to said polypropylene.

* * * * *